United States Patent [19]

Sommargren et al.

[11] Patent Number: 4,688,940

[45] Date of Patent: Aug. 25, 1987

[54] HETERODYNE INTERFEROMETER SYSTEM

[75] Inventors: Gary E. Sommargren, Madison; Moshe Schaham, West Hartford, both of Conn.

[73] Assignee: Zygo Corporation, Middlefield, Conn.

[21] Appl. No.: 710,928

[22] Filed: Mar. 12, 1985

[51] Int. Cl.[4] ................................................ G01B 9/02
[52] U.S. Cl. ...................................... 356/349; 356/358
[58] Field of Search .................................. 356/349, 358

[56] References Cited

U.S. PATENT DOCUMENTS 3,656,853  4/1972  Bagley et al. ...................... 356/349

OTHER PUBLICATIONS

Domyshev et al., "Measurements of Small Mechanical Displacements and Vibrations of Specimens Using a Laser", Instrum. & Exp. Tech., vol. 22, No. 3, pp. 837–839, 6/79.

Primary Examiner—Davis L. Willis
Assistant Examiner—Matthew W. Koren
Attorney, Agent, or Firm—Stiefel, Gross, Kurland & Pavane

[57] ABSTRACT

A heterodyne interferometer system utilizes a single stabilized frequency linearly polarized laser input beam (18) from a light source (10) which is provided to an acousto-optic device (20) along with a frequency stabilized electrical reference signal (32) from an oscillator (30) for transforming the input beam (18) into a pair of orthogonally polarized beams (40,50) differing in frequency by the reference signal frequency prior to providing these beams (40,50) to a polarization type interferometer (70). A mixing polarizer (60) mixes the beams (46,56) after they traverse the interferometer (70) and provides the mixed beams (62,64) to a photoelectric detector (65) where they are utilized to produce an electrical measurement signal (66). This electrical measurement signal (66) is processed in a phase meter/accumulator (68) along with the reference signal (32) to produce an output signal (80) which is the sum of phase difference on a cycle-by-cycle basis between the measurement signal (66) and the reference signal (32). The phase meter/accumulator (68) includes an analog-to-digital converter (83) and a memory register (92) for the previous cycle, with the measurement resolution being determined by the number of bits of the analog-to-digital converter (83).

58 Claims, 5 Drawing Figures

HETERODYNE INTERFEROMETER SYSTEM

CROSS-REFERENCE TO RELATED APPLICATIONS

This application is related to the commonly owned United States patent applications entitled "Apparatus To Transform A Single Frequency, Linearly Polarized Laser Beam Into A Beam With Two, Orthogonally Polarized Frequencies", and "Apparatus To Transform A Single Frequency, Linearly Polarized Laser Beam Into A High Efficiency Beam With Two Orthogonally Polarized Frequencies" both of which name Gary E. Sommargren as sole inventor thereto and both of which are contemporaneously filed herewith on Mar. 12, 1985 and the contents of which are specifically incorporated by reference herein and which bear U.S. Ser. Nos. 710,859, and 710,927, respectively.

FIELD OF THE INVENTION

The present invention relates to gauging apparatus of the optical interferometer type. More particularly, the invention relates to apparatus which uses two optical frequencies to measure accurately either changes in length or changes in optical length.

BACKGROUND ART

The use of optical interferometry to measure changes in either length, distance, or optical length has grown significantly due not only to technological advances in lasers, photosensors, and microelectronics but also to an ever increasing demand for high precision, high accuracy measurements. The prior art interferometers can be generally categorized into two types based on the signal processing technique used, i.e., either homodyne or heterodyne, see for example, H. Matsumoto, "Recent Interferometric Measurements Using Stabilized Lasers", *Precision Engineering*, Vol. 6, pp. 87–94 (April 1984). The interferometers based on the heterodyne technique are generally preferred because (1) they are insensitive to low frequency drift and noise and (2) they can more readily have their resolution extended. Within the heterodyne type of interferometers, of particular interest are the ones based on the use of two optical frequencies, see for example, G. Bouwhuis, "Interferometrie Met Gaslasers", *Ned. T. Natuurk*, Vol. 34, pp. 225–232 (August 1968); Bagley et al, U.S. Pat. No. 3,458,259, issued July 29, 1969; *Hewlett Packard Journal* (August 1970); Bagley et al, U.S. Pat. No. 3,656,853, issued Apr. 18, 1972; *Hewlett Packard Journal* (April 1983).

DISCLOSURE OF THE INVENTION

In accordance with the instant invention, we provide a heterodyne interferometer system capable of measuring accurately either changes in length or changes in optical length comprising: (1) a source of a stabilized single frequency, linearly polarized input beam, most preferably a laser; (2) means, most preferably a frequency stabilized electronic oscillator to provide an electrical reference signal of frequency $f_o$; (3) means, most preferably an acousto-optic device, for transforming said input beam into a beam with two optical frequencies, with the two different frequencies orthogonally polarized, and with a frequency difference between the two frequencies equal to $f_o$; (4) means, most preferably an interferometer, having a fixed length optical path traversed by one of said two frequencies and a variable length optical path traversed by the other of said two frequencies; (5) means, most preferably a polarizer, for mixing said beams after they traverse said interferometer; (6) means, most preferably a photoelectric detector to produce an electrical measurement signal; (7) means, most preferably a phase meter/accumulator, to indicate the difference in phase between said reference signal and said measurement signal; (8) means for producing an output signal from said phase difference which is the change in length of said variable length optical path of said interferometer.

BEST MODE FOR CARRYING OUT THE INVENTION

Figure 1:
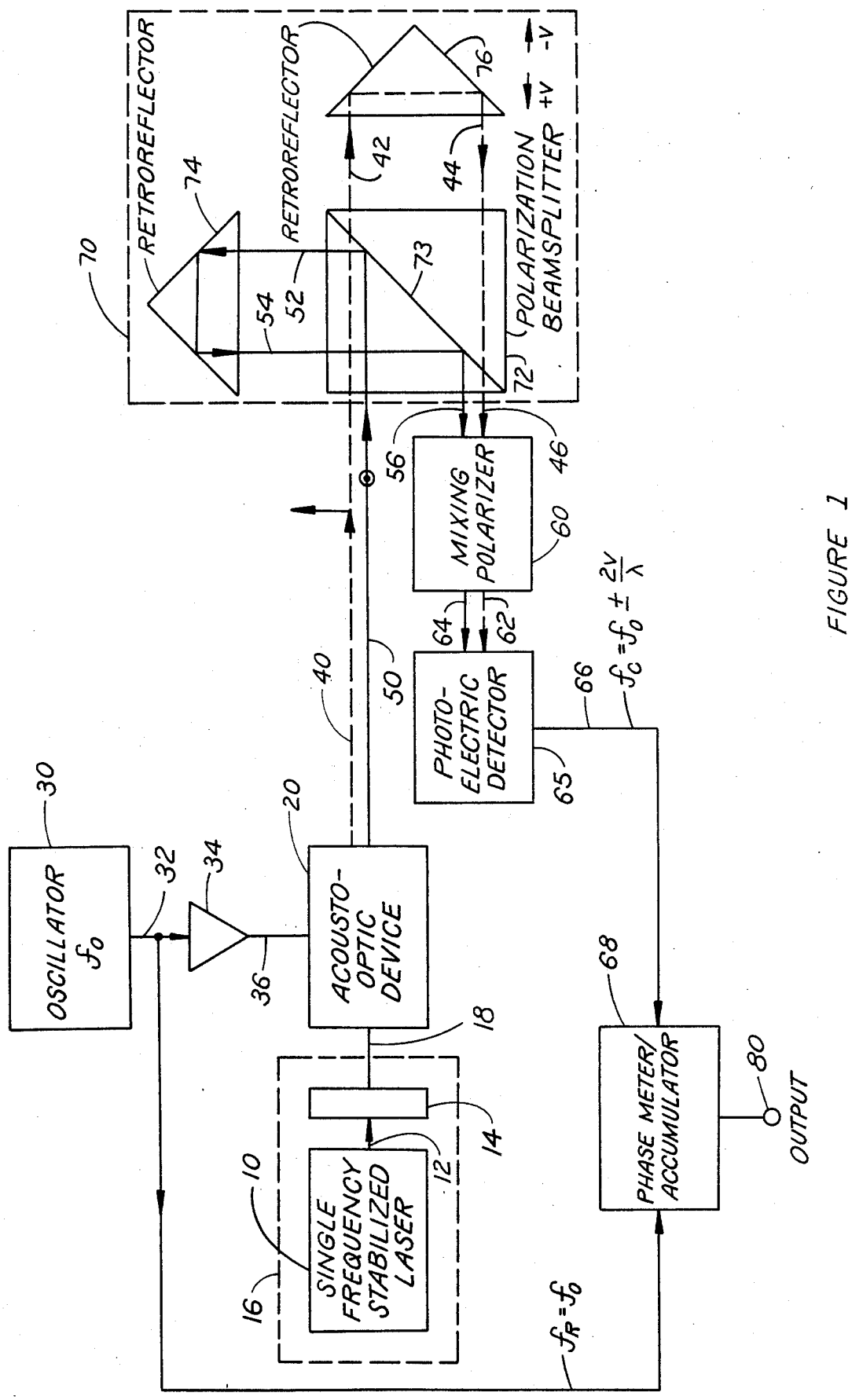
FIG. 1 depicts in schematic form an embodiment of the instant invention.

FIG. 1 depicts in schematic form an embodiment of the instant invention. While the apparatus has application for a wide range of radiation sources, the following description is taken by way of example with respect to an optical measuring system. The term "radiant energy" as used herein includes, but is not limited to, electromagnetic energy of all frequency ranges. A light source (10), most preferably a laser, provides a beam (12) of optical energy which has a single, stabilized frequency and is linearly polarized. Light source (10) can be any of a variety of lasers. For example, it can be a gas laser, e.g., a helium-neon, stabilized in any of a variety of techniques known to those skilled in the art to produce beam (12), see for example, T. Baer et al, "Frequency stabilization of a 0.633 μm He-Ne longitudinal Zeeman laser", *Applied Optics*, Vol. 19, pp. 3173–3177 (1980); Burgwald et al, U.S. Pat. No. 3,889,207 issued June 10, 1975; and Sandstrom et al, U.S. Pat. No. 3,662,279 issued May 9, 1972. Alternatively, light source (10) can be a diode laser frequency stabilized in one of a variety of techniques known to those skilled in the art to produce beam (12), see for example, T. Okoshi and K. Kikuchi, "Frequency Stabilization of Semiconductor Lasers for Heterodyne-type Optical Communication Systems, *Electronic Letters*, Vol. 16, pp. 179–181 (1980) and S. Yamaguchi and M. Suzuki, "Simultaneous Stabilization of the Frequency and Power of an AlGaAs Semiconductor Laser by Use of the Optogalvanic Effect of Krypton", *IEEE J. Quantum Electronics*, Vol. QE-19, pp. 1514–1519 (1983). The specific device used for source (10) will determine the diameter and divergence of beam (12). For some sources, e.g., a diode laser, it is necessary to use beam forming optics (14), e.g., a microscope objective, to provide an input beam (18) with a suitable diameter and divergence for the elements that follow. When source (10) is a helium-neon laser, for example, beam forming optics (14) may be required. The elements (10) and (14) are shown in a dashed box (16) which is the source of the input beam (18) which has one stabilized frequency $f_L$ and is linearly polarized. Electronic oscillator (30) provides a frequency stabilized reference electrical signal (32) of frequency $f_o$ to the power amplifier (34). The electrical output (36) of power amplifier (34) is used to drive the acousto-optical (A-O) device (20). A-O device (20), such as one comprising a Bragg cell, is preferably the apparatus disclosed in the commonly owned co-pending application, contemporaneously filed U.S. patent application entitled "Apparatus To Transform a Single Frequency, Linearly Polarized Laser Beam Into a Beam Into a Beam with Two Orthogonally Polarized Frequencies", bearing U.S. Ser. No. 710,859, filed Mar. 12, 1985, the contents of which are specifically incorporated by reference herein.

For ease of understanding, the pertinent portions of the description of the A-O device (20) described in U.S. Ser. No. 710,859 shall be repeated herein with reference to FIGS. 4 and 5 which correspond to FIGS. 1 and 2, respectively, of U.S. Ser. No. 710,859, with the exception that the reference numerals have been changed to avoid confusion where necessary.

Figure 4:
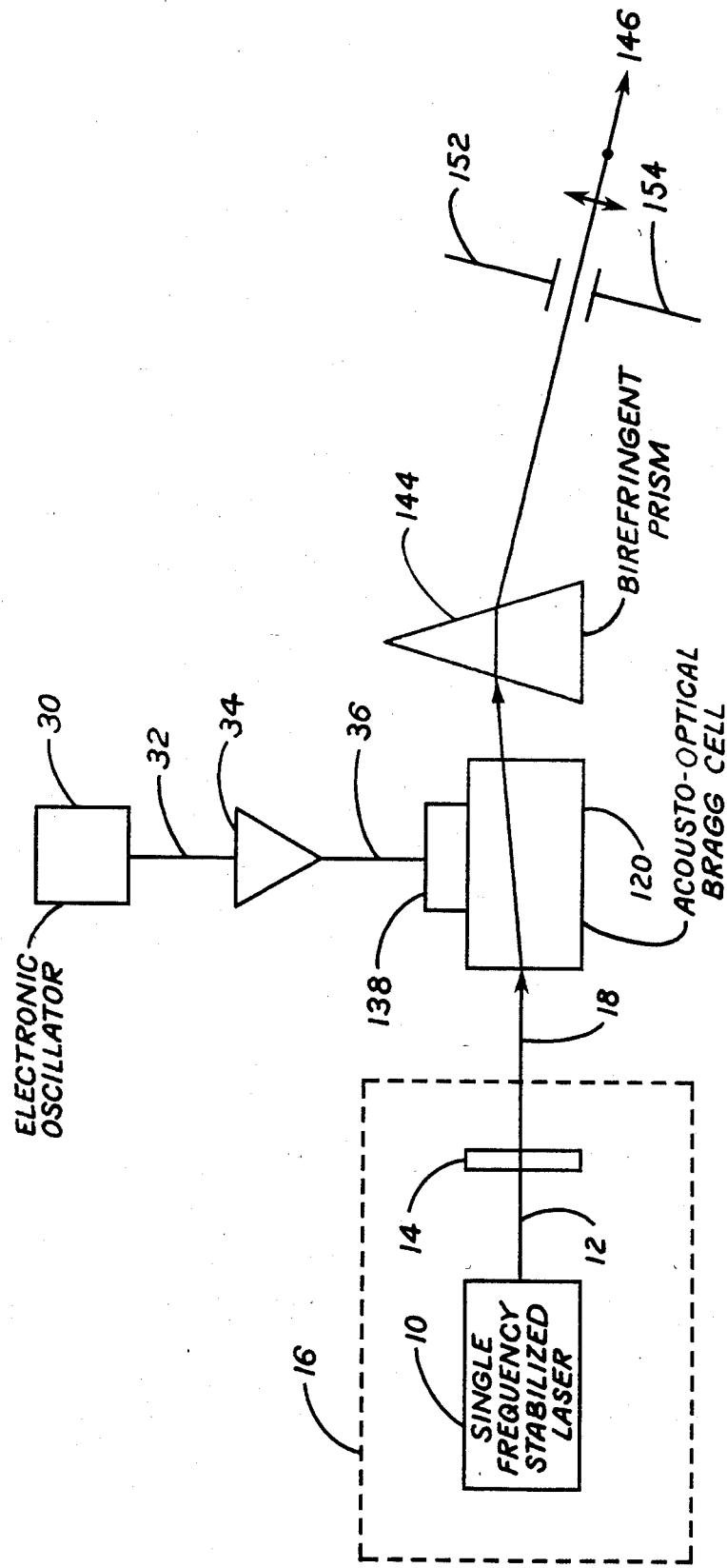
FIG. 4 depicts in schematic form an embodiment of the invention described in U.S. Ser. No. 710,859, filed Mar. 12, 1985.
Figure 5:
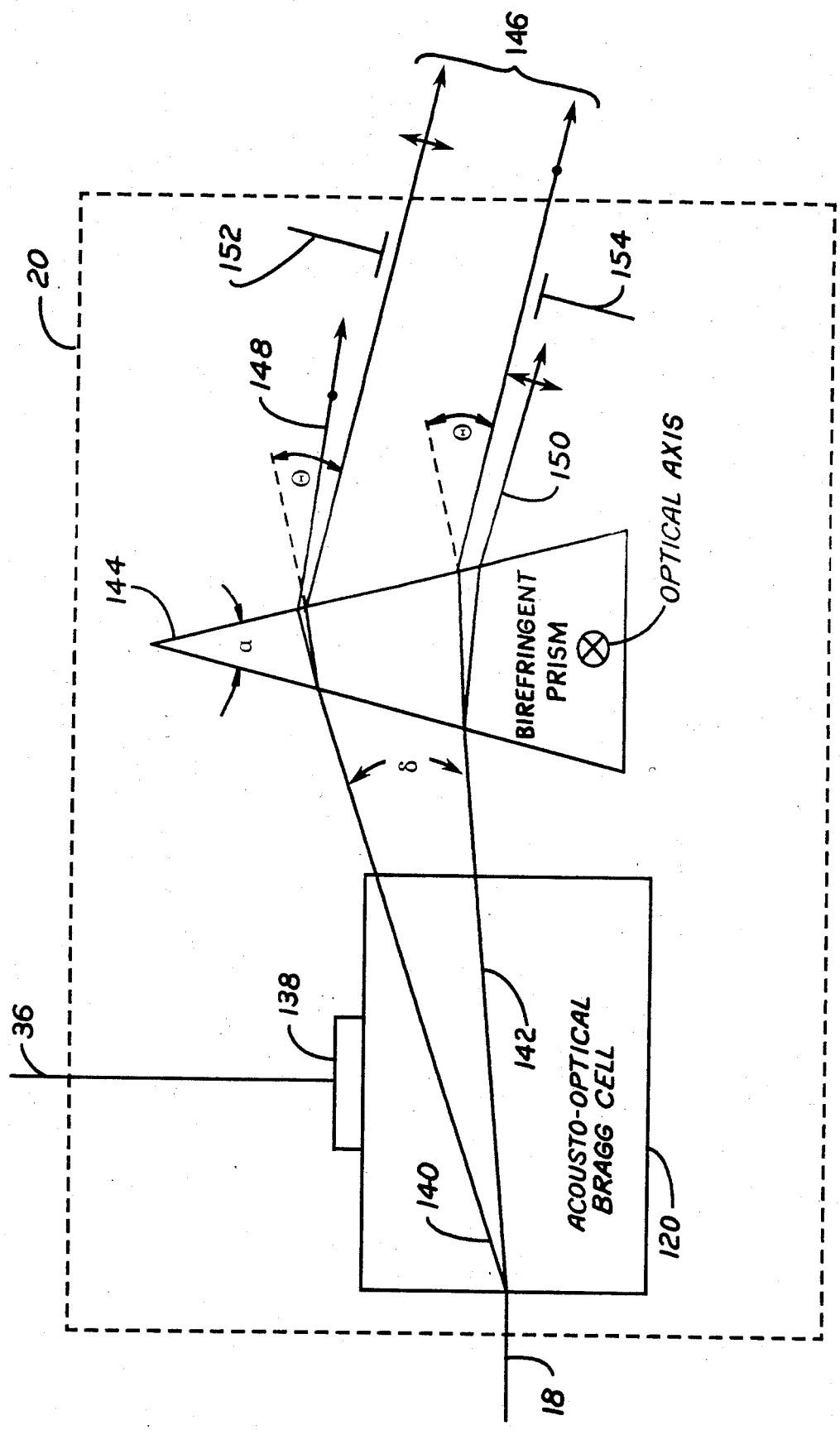
FIG. 5 depicts in schematic form the detailed propagation of the light beams through the birefrigent prism of FIG. 4.

As shown and preferred in FIG. 4, light source (10) is the same as described above with reference to FIG. 1, and provides a beam (12) of optical energy which has a single, stabilized frequency and is linearly polarized and can be any of a variety of lasers. For example, as previously mention, it can be a gas laser, e.g. a helium-neon gas laser, stabilized in any of a variety of conventional techniques known to those skilled in the art to produce beam (12). Alternatively, light source (10), as previously mentioned, can be diode laser frequency stabilized in one of a variety of techniques known to those skilled in the art to produce beam (12). As was true with respect to FIG. 1, the specific device used for source (10) will determine the diameter and divergence of beam (12). For some sources, e.g., a diode laser, it is necessary to use the aforementioned beam forming optics (14), e.g. a microscope objective, to provide an input beam (18) with a suitable diameter and divergence for the elements that follow. When source (10) is a helium-neon laser, for example, beam forming optics (14) may not be required. The elements (10) and (14) are shown in a dashed box (16) which is the source of the input beam (18) which has one stabilized frequency $f_L$ and is linearly polarized. The polarization orientation, by way of example, is preferably 45° to the plane of the figure. As in FIG. 1, electrical oscillator (30) provides a frequency stabilized electrical signal (32) comprised of frequencies $f_1$ and $f_2$ to the power amplifier (34). The electrical output (36) of power amplifier (34) is used to drive a piezoelectric transducer (138) affixed to the acousto-optical Bragg cell (120). FIG. 5 depicts in schematic form the detailed propagation of input beam (18) through the acousto-optical Bragg cell (120) and the birefringent prism (144). Bragg cell (120) transforms the input beam (18) into two intermediate beams (140) and (142). While the linear polarization of beams (140) and (142) are the same as input beam (18), their directions of propagation and frequencies differ from those of input beam (18). In particular, the direction of propagation of beam (140) is deviated by a small angle, $\delta$, from that of (142). In addition, the frequency $f_L+f_2$ of beam (140) differs from the frequency $f_L+f_1$ of beam (142) by an amount equal to $f_2-f_1$, i.e., the difference of drive frequencies of the Bragg cell (120). The electrical output (36) of power amplifier (34) is adjusted so that beams (140) and (142) have approximately the same intensity which is approximately one-half that of input beam (18).

Beams (140) and (142) are incident on birefringent prism (144) which is made of a crystal (e.g. quartz) with the optical Axis parallel to the apex edge. The apex angle, $\alpha$ is chosen to satisfy the equation $$\alpha = \sin^{-1}\left[n_o\sin\left(\alpha - \sin^{-1}\left(\frac{\sin\theta}{n_o}\right)\right)\right] - \sin^{-1}\left[n_e\sin\left(\alpha - \sin^{-1}\left(\frac{\sin\theta}{n_e}\right)\right)\right]$$

where $n_o$ and $n_e$ are the ordinary and extraordinary indices of refraction, respectively and $\theta$ is the exit angle of the output beam (146). Birefringent prism (144) acts on intermediate beam (140) and (142) to split each into two orthogonally polarized beams, one parallel and one perpendicular to the plane of the figure, to produce an output beam (146) and two spurious beams (148) and (150). The output beam (146) has two orthogonal polarization components, corresponding to beams (40) and (50) in FIG. 1, and has a frequency difference $f_2-f_1$ between the two orthogonal polarization components. The spatial separation of the polarization components is minute, only a small fraction of the beam diameter. It is illustratively shown greatly exaggerated in the figure. Spurious beams (148) and (150) have directions of propagation different from output beam (146) so that they can be eliminated by opaque stops (152) and (154). The function of blocking spurious beams (148) and (150) could, alternatively, be performed using a conventional pin hole spatial filter arrangement.

In some instances, where the desired frequency shift is 20 MHz or greater, the above device may be simplified by eliminating $f_1$ in electrical signal (32) (i.e., $f_1=0$) causing beam (142) to have the same direction of propagation and frequency as input beam (18) but otherwise not altering the operation of the device. Beams (40) and (50) are collinear but are shown displaced in FIG. 1 for clarity, have nearly equal intensity, are orthogonally polarized, and differ in frequency by the frequency of the reference electrical signal, i.e., $f_o$. Beams (40) and (50) are applied to the interferometer (70) which is comprised of a pair of retroreflectors (74) and (76) and polarization beamsplitter (72), although it should be noted that it is not limited to this particular interferometer configuration. The instant invention can be used with a wide variety of polarization type interferometers. Polarization beamsplitter (72) transmits completely the p polarized light, i.e., light with its polarization vector in the plane of incidence, and reflects completely the s polarized light, i.e., light with its polarization vector perpendicular to the plane of incidence.

The diagonal (73) is the beam splitter surface of polarization beamsplitter (72). Thus, beam (40) is transmitted by polarization beamsplitter (72) to produce beam (42), and beam (50) is reflected by polarization beamsplitter (72) to produce beam (52). Beam (52) is retroreflected by retroreflector (74) to produce beam (54) which is in turn again reflected by polarization beamsplitter (72) to produce beam (56). Retroreflector (74) is fixed relative to polarization beamsplitter (72). Retroreflectors (74) and (76) maintain the state of polarization between their output and input beams. Thus, beam (54) is pure s polarization, and beam (44) is pure p polarization. Polarization beamsplitter (72) then reflects beam (54) and transmits beam (44) to produce beams (56) and (46) which are collinear and orthogonally polarized. Retroreflector (76) is movable in a direction parallel with beam (42), see the arrow in FIG. 1. The mixing polarizer (60) mixes the parallel and overlapping portions of beams (46) and (56) to provide each of these beams with a component of similar polarization, i.e., beams (62) and (64). These similarly polarized beams (62) and (64) are mixed by a photoelectric detector (65) to produce an electrical signal (66) having a frequency of $f_c$. Photoelectric detector (65) has a square law detection characteristic. As explained in the other figures, the phase meter/accumulator (68) uses signal (32) and signal (66) to produce an output signal (80) which corresponds to the change in length of the variable length optical path of the interferometer (70).

The frequency of the measurement signal (66), is given by equation:

$$f_c = f_o 2v/\lambda$$

where $f_o$ is the frequency of the reference signal (32);

v is the velocity of the moving retroreflector (76). v is positive or negative when the motion is toward or away from beamsplitter (72), respectively;

$\lambda$ is the wavelength of the measurement beam (42).

The output (80), which is proportional to the displacement of the moving retroreflector (76), is derived by integrating the frequency difference between the measurement signal (66) and the reference signal (32).

Integrating the subtracted frequencies above is equivalent to adding the phase differences between them on a cycle-by-cycle basis.

Figure 2:
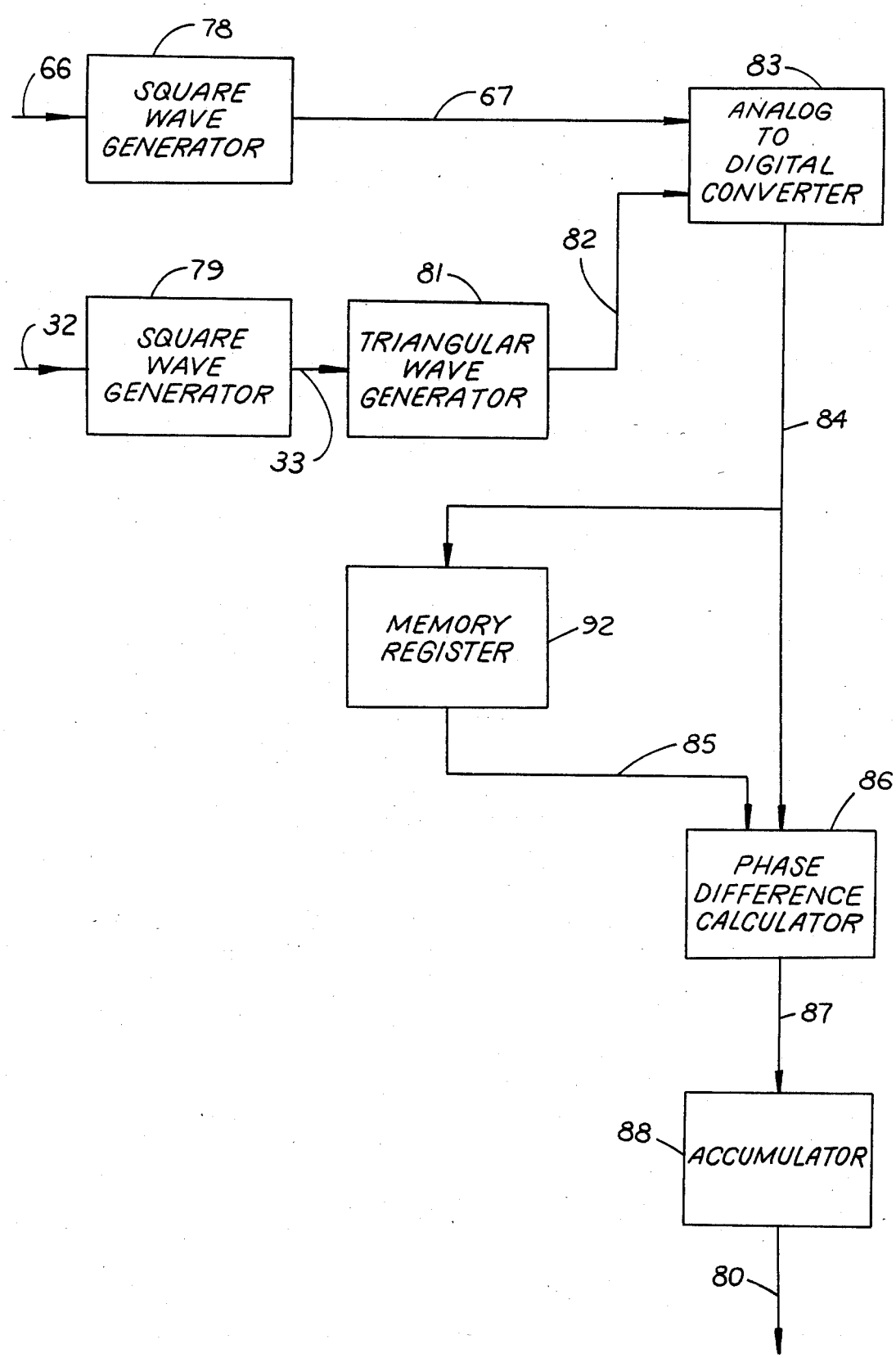
FIG. 2 depicts in schematic form the block diagram of the processing electronics of the instant invention.
Figure 3:
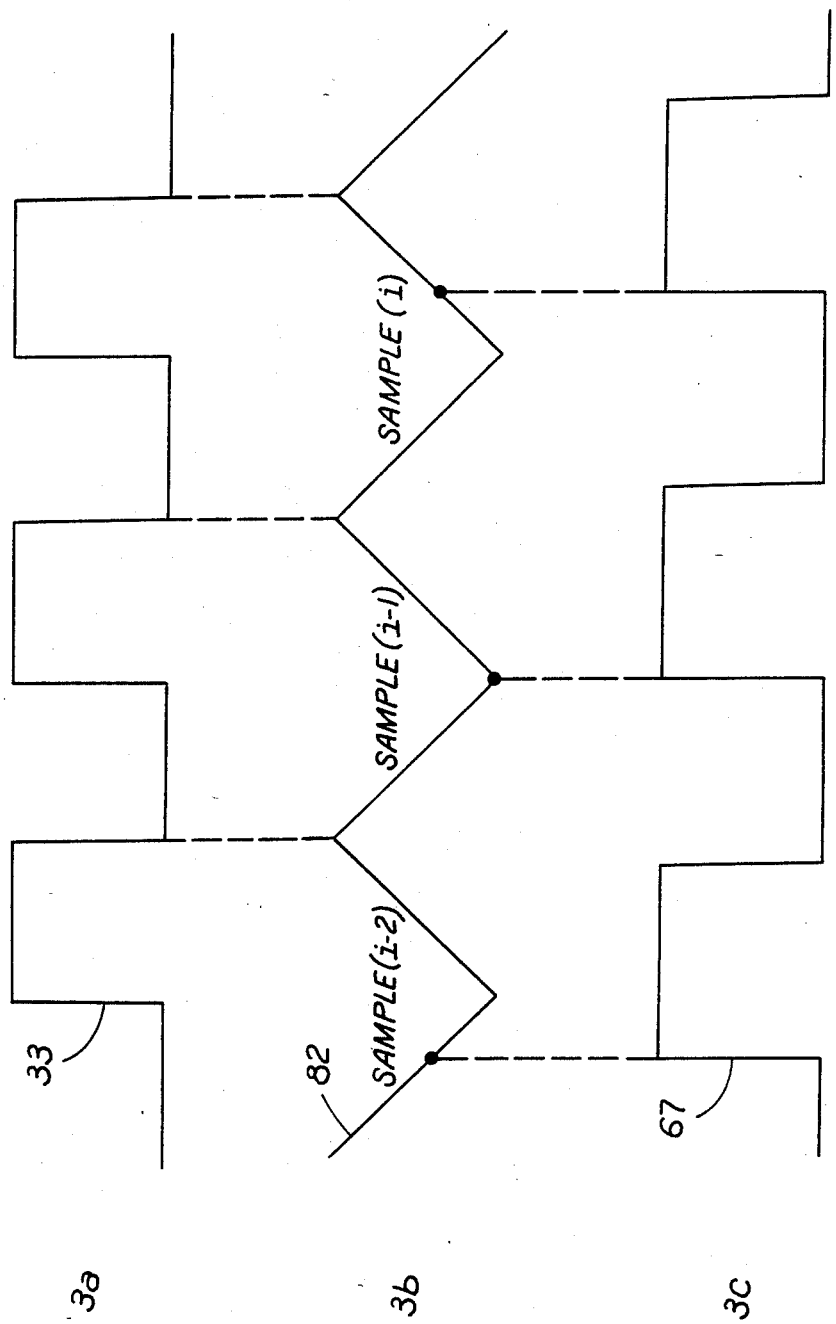
FIG. 3 illustrates the signals used to implement the measurement in the instant invention.

FIG. 2 depicts in schematic form the block diagram of the phase meter/accumulator (68). Sinusoidal measurement signal (66) is converted by square wave generator (78) into square wave measurement signal (67), shown in detail in FIG. 3c. Sinusoidal reference signal (32) is converted by square wave generator (79) into square wave reference signal (33), shown in detail in FIG. 3a. Signal (33) is then converted by triangular wave generator (81) into triangular wave reference signal (82), shown in detail in FIG. 3b. Signal (82) is sampled by a high speed analog-to-digital converter (83) every cycle of the measurement signal (67) (FIGS. 3b and 3c).

The digital output (84) of the analog-to-digital converter (83) is proportional to the phase of the reference signal at the sampling instant.

The phase difference output (87) is derived by the phase difference calculator (86) from the digital output (84) of the analog-to-digital converter (83) and the corresponding previous cycle output (85) which was kept in a memory register (92). The phase difference output (87) is the measure of phase difference between the reference signal (32) and the measurement signal (66) at each sampling instant. For example, in FIG. 3 the phase difference output (87) at the instant of sample(i) will be derived by:

sample(i)-sample(i−1)

The phase differences (87) that are calculated at each cycle of the measurement signal are added to the content of the accumulator (88). The output (80) of the accumulator (88), which is the sum of phase differences is proportional to the displacement of the moving retroreflector (76). The measured displacement d is given by the equation:

$$d = \frac{N\lambda}{4(2^m - 1)}$$

where

N is the output (80) of the accumulator (88);

$\lambda$ is the wavelength of the measurement beam (42); and m is the number of bits of the analog-to-digital converter (83).

As indicated by the equation above, the measurement resolution is given by:

$$\frac{\lambda}{4(2^m - 1)}.$$

With a 7-bit analog-to-digital converter (83), for instance, the measurement resolution is $\lambda/508$, which is substantially higher than the intrinsic interferometer resolution of $\lambda/2$.

In the measurement system described in Bagley et al, U.S. Pat. No. 3,656,853 issued Apr. 18, 1972, to increase the measurement resolution beyond $\lambda/4$ both the reference and measurement frequencies are multiplied by the desired factor, which results in a reduction of the maximum velocity allowed for the moving retroreflector. Thus, the higher the resolution being chosen, the lower is the maximum allowable velocity.

By contrast, in the instant invention where the measurement resolution is determined by the number of bits of the analog-to-digital converter (83), a high measurement resolution can be maintained without requiring a reduction in the maximum allowable velocity of the moving retroreflector.

Furthermore, the use of a relatively high frequency difference between beams (40) and (50) as opposed to the limited frequency difference attained by using a Zeeman split laser source, enhances the instant invention's measurement capability at substantially higher velocities of the moving retroreflector (76).

In addition, using an oscillator (30) to generate the frequency difference between beams (40) and (50) in the instant invention, enables the generation of the reference signal (32) from that frequency and eliminates the need for a second optical mixer which is required in the system described in the aforementioned Bagley et al, U.S. patents.

The principal advantages of the instant invention are: (1) increased measurement resolution, (2) the capability to measure rapidly changing lengths or optical lengths, (3) requires only one optical mixer, and (4) the ability to use a broad range of laser sources.

While the preferred embodiment of the invention has been disclosed, obviously modification can be made therein, without departing from the scope of the invention as defined in the following claims:

What is claimed is:

1. A heterodyne interferometer system comprising:
   a light source for providing a linearly polarized single stabilized first frequency optical input beam;
   means for providing a frequency stabilized reference electrical signal having a second frequency;
   acousto-optical means coupled to said single input beam providing means and said reference signal providing means for directly transforming said single input beam into a pair of collinear orthogonally polarized beams having associated optical frequencies which differ in frequency from each other by said reference signal second frequency;

means coupled to said acousto-optical means and having a fixed length optical path traversed by one of said pair of collinear orthogonally polarized beams and a variable length optical path traversed by said other one of said pair of collinear orthogonally polarized beams for providing interferometric output beams;

means coupled to said interferometric output beam providing means for mixing said interferometric output beams;

means coupled to said mixing means for providing an electrical measurement signal from said mixed interferometric output beams; and means coupled to said measurement signal providing means and said reference signal providing means for providing an output signal based on a difference in phase between said reference signal and said measurement signal, said phase difference being based on a change in length of said variable length optical path in said interferometric output beam providing means.

2. A heterodyne interferometer system in accordance with claim 1, wherein said interferometric output beam providing means is an interferometer, said mixing means mixing said interferometric output beams after they have traversed said interferometer.

3. A heterodyne interferometer system in accordance with claim 2, wherein said interferometer comprises a polarization type interferometer.

4. A heterodyne interferometer system in accordance with claim 3, wherein said polarization type interferometer comprises a pair of orthogonally disposed retroreflectors and a polarization beamsplitter optically aligned therewith.

5. A heterodyne interferometer system in accordance with claim 4, wherein said pair of collinear orthogonally polarized beams are substantially equal in intensity.

6. A heterodyne interferometer system in accordance with claim 1, wherein said pair of collinear orthogonally polarized beams are substantially equal in intensity.

7. A heterodyne interferometer system in accordance with claim 5, wherein said light source comprises a laser source, said single input beam being a laser beam.

8. A heterodyne interferometer system in accordance with claim 7, wherein said reference signal providing means comprises a frequency stabilized oscillator.

9. A heterodyne interferometer system in accordance with claim 8, wherein said reference signal providing means further comprises a power amplifier electrically connected between said oscillator and said acousto-optical means for driving said acousto-optical means.

10. A heterodyne interferometer system in accordance with claim 9, wherein said laser comprises a helium neon gas laser.

11. A heterodyne interferometer system in accordance with claim 9, wherein said laser comprises a diode laser.

12. A heterodyne interferometer system in accordance with claim 11, wherein said light source further comprises beam forming optics associated with said diode laser for providing said input single beam.

13. A heterodyne interferometer system in accordance with claim 9, wherein said polarization beamsplitter transmits completely light having its polarization vector in the plane of incidence and reflects completely light having its polarization vector perpendicular to the plane of incidence for providing a transmitted beam and a reflected beam of said pair of collinear orthogonally polarized beams.

14. A heterodyne interferometer system in accordance with claim 13, wherein one of said pair of retroreflectors is fixed relative to said polarization beamsplitter and the other of said pair of retroreflectors is movable relative to said polarization beamsplitter in a direction parallel with said transmitted beam of said collinear orthogonally polarized pair of beams.

15. A heterodyne interferometer system in accordance with claim 14, wherein said mixing means comprises a mixing polarizer for providing a pair of mixed interferometric output beams having a component of similar polarization to said electrical measurement signal providing means.

16. A heterodyne interferometer system in accordance with claim 15, wherein said electrical measurement signal providing means comprises a photoelectric detector.

17. A heterodyne interferometer system in accordance with claim 16, wherein said photoelectric detector has a square law detection characteristic.

18. A heterodyne interferometer system in accordance with claim 17, wherein said output signal providing means comprises a phase meter/accumulator means.

19. A heterodyne interferometer system in accordance with claim 16, wherein said output signal providing means comprises a phase meter/accumulator means.

20. A heterodyne interferometer system in accordance with claim 19, wherein said electrical measurement signal has a frequency $f_c$ defined by the expression:

$$f_c = f_o + 2v/\lambda$$

where
$f_o$ is the frequency of said reference signal;
v is the velocity of said movable retroreflector, being positive when the movement is toward said beamsplitter and negative when the movement is away from said beamsplitter; and
$\lambda$ is the wavelength of a measurement beam derived from the transmitting of one of said pair of collinear orthogonally polarized beams by said beamsplitter.

21. A heterodyne interferometer system in accordance with claim 18, wherein said electrical measurement signal has a frequency $f_c$ defined by the expression:

$$f_c = f_o + 2v/\lambda$$

where
$f_o$ is the frequency of said reference signal;
v is the velocity of said movable retroreflector, being positive when the movement is toward said beamsplitter and negative when the movement is away from said beamsplitter; and
$\lambda$ is the wavelength of a measurement beam derived from the transmitting of one of said pair of collinear orthogonally polarized beams by said beamsplitter.

22. A heterodyne interferometer system in accordance with claim 20, wherein said phase meter/accumlator means comprises means for integrating the frequency difference between said measurement signal and said reference signal for providing said output signal which is proportional to the displacement of said movable retroreflector.

23. A heterodyne interferometer system in accordance with claim 20, wherein said integrating means comprises means for adding the phase differences between said measurement signal and said reference signal on a cycle-by-cycle basis.

24. A heterodyne interferometer system in accordance with claim 23, wherein said cycle-by-cycle phase difference adding means comprises analog-to-digital conversion means connected to said measurement signal providing means and said reference signal providing means for providing a digital output signal proportional to the phase of said reference signal at the sampling instant.

25. A heterodyne interferometer system in accordance with claim 24, wherein said phase difference adding means further comprises a triangular wave generation means connected between said analog-to-digital conversion means and said reference signal providing means for generating a triangular reference signal from said frequency stabilized reference signal, said triangular reference signal being sampled by said analog-to-digital conversion means every cycle of said measurement signal.

26. A heterodyne interferometer system in accordance with claim 25, wherein said phase difference adding means further comprises a memory register connected to said analog-to-digital conversion means output for storing the corresponding previous cycle output of said analog-to-digital conversion means.

27. A heterodyne interferometer system in accordance with claim 26, wherein said phase difference adding means further comprises a phase difference calculator means connected to said analog-to-digital conversion means output and said memory register for providing a phase difference output signal derived from said digital output signal and said corresponding previous cycle output stored in said memory register, said phase difference output signal being the measure of phase difference between said reference signal and said measurement signal at each sampling instant.

28. A heterodyne interferometer system in accordance with claim 27, wherein said phase difference adding means further comprises accumlator means connected to said phase difference calculator means for adding the phase differences calculated at each cycle of said measurement signal, said output signal from said accumulator means being the sum of said phase differences and being proportional to the displacement of said movable retroreflector, the measured displacement d of said movable retroreflector being defined by the expression:

$$d = \frac{N\lambda}{4(2^m - 1)}$$

where
N is the output of said accumulator means;
λ is the wavelength of said measurement beam;
m is the number of bits of said analog-to-digital conversion means; and $$\frac{\lambda}{4(2^m - 1)}$$

is the measurement resolution of said system.

29. A heterodyne interferometer system in accordance with claim 28, wherein said analog-to-digital conversion means comprises a seven bit analog-to-digital converter and said measurement resolution is λ/508.

30. A heterodyne interferometer system in accordance with claim 1, wherein said light source comprises a laser source, said single input beam being a laser beam.

31. A heterodyne interferometer system in accordance with claim 30, wherein said reference signal providing means comprises a frequency stabilized oscillator.

32. A heterodyne interferometer system in accordance with claim 31, wherein said reference signal providing means further comprises a power amplifier electrically connected between said oscillator and said acousto-optical means for driving said acousto-optical means.

33. A heterodyne interferometer system in accordance with claim 30, wherein said interferometer comprises a polarization type interferometer.

34. A heterodyne interferometer system in accordance with claim 33, wherein said polarization type interferometer comprises a pair of orthogonally disposed retroreflectors and a polarization beamsplitter optically aligned therewith.

35. A heterodyne interferometer system in accordance with claim 34, wherein one of said pair of retroreflectors is fixed relative to said polarization beamsplitter and the other of said pair of retroreflectors is movable relative to said polarization beamsplitter in a direction parallel with said transmitted beam of said collinear orthogonally polarized pair of beams.

36. A heterodyne interferometer system in accordance with claim 35, wherein said electrical measurement signal has a frequency $f_c$ defined by the expression:

$$f_c = f_o + 2v/\lambda$$

where
$f_o$ is the frequency of said reference signal;
v is the velocity of said movable retroreflector, being positive when the movement is toward said beamsplitter and negative when the movement is away from said beamsplitter; and
λ is the wavelength of a measurement beam derived from the transmitting of one of said pair of collinear orthogonally polarized beams by said beamsplitter.

37. A heterodyne interferometer system in accordance with claim 36, wherein said output signal providing means comprises means for integrating the frequency difference between said measurement signal and said reference signal for providing said output signal which is proportional to the displacement of said movable retroreflector.

38. A heterodyne interferometer system in accordance with claim 37, wherein said integrating means comprises means for adding the phase differences between said measurement signal and said reference signal on a cycle-by-cycle basis.

39. A heterodyne interferometer system in accordance with claim 38, wherein said cycle-by-cycle phase difference adding means comprises analog-to-digital conversion means connected to said measurement signal providing means and said reference signal providing means for providing a digital output signal proportional to the phase of said reference signal at the sampling instant.

40. A heterodyne interferometer system in accordance with claim 39, wherein said phase difference adding means further comprises a triangular wave generation means connected between said analog-to-digital conversion means and said reference signal providing means for generating a triangular reference signal from said frequency stabilized reference signal, said triangular reference signal being sampled by said analog-to-digital conversion means every cycle of said measurement signal.

41. A heterodyne interferometer system in accordance with claim 40, wherein said phase difference adding means further comprises a memory register connected to said analog-to-digital conversion means output for storing the corresponding previous cycle output of said analog-to-digital conversion means.

42. A heterodyne interferometer system in accordance with claim 39, wherein said phase difference adding means further comprises a memory register connected to said analog-to-digital conversion means output for storing the corresponding previous cycle output of said analog-to-digital conversion means.

43. A heterodyne interferometer system in accordance with claim 42, wherein said phase difference adding means further comprises a phase difference calculator means connected to said analog-to-digital conversion means output and said memory register for providing a phase difference output signal derived from said digital output signal and said corresponding previous cycle output stored in said memory register, said phase difference output signal being the measure of phase difference between said reference signal and said measurement signal at each sampling instant.

44. A heterodyne interferometer system in accordance with claim 43, wherein said phase difference adding means further comprises accumlator means connected to said phase difference calculator means for adding the phase differences calculated at each cycle of said measurement signal, said output signal from said accumulator means being the sum of said phase differences and being proportional to the displacement of said movable retroreflector, the measured displacement d of said movable retroreflector being defined by the expression:

$$d = \frac{N\lambda}{4(2^m - 1)}$$

where
N is the output of said accumulator means;
$\lambda$ is the wavelength of said measurement beam;
m is the number of bits of said analog-to-digital conversion means; and $$\frac{\lambda}{4(2^m - 1)}$$

is the measurement resolution of said system.

45. A heterodyne interferometer system in accordance with claim 44, wherein said analog-to-digital conversion means comprises a seven bit analog-to-digital converter and said measurement resolution is $\lambda/508$.

46. A heterodyne interferometer system in accordance with claim 41 wherein said phase difference adding means further comprises a phase difference calculator means connected to said analog-to-digital conversion means output and said memory register for providing a phase difference output signal derived from said digital output signal and said corresponding previous cycle output stored in said memory register, said phase difference output signal being the measure of phase difference between said reference signal and said measurement signal at each sampling instant.

47. A heterodyne interferometer system in accordance with claim 46, wherein said phase difference adding means further comprises accumlator means connected to said phase difference calculator means for adding the phase differences calculated at each cycle of said measurement signal, said output signal from said accumulator means being the sum of said phase differences and being proportional to the displacement of said movable retroreflector, the measured displacement d of said movable retroreflector being defined by the expression:

$$d = \frac{N\lambda}{4(2^m - 1)}$$

where
N is the output of said accumulator means;
$\lambda$ is the wavelength of said measurement beam;
m is the number of bits of said analog-to-digital conversion means; and $$\frac{\lambda}{4(2^m - 1)}$$

is the measurement resolution of said system.

48. A heterodyne interferometer system in accordance with claim 47, wherein said analog-to-digital conversion means comprises a seven bit analog-to-digital converter and said measurement resolution is $\lambda/508$.

49. A heterodyne interferometer system in accordance with claim 1, wherein said interferometric output beam providing means comprises a polarization type interferometer.

50. A heterodyne interferometer system in accordance with claim 49, wherein said polarization type interferometer comprises a pair of orthogonally disposed retroreflectors and a polarization beamsplitter optically aligned therewith.

51. A heterodyne interferometer system in accordance with claim 50, wherein one of said pair of retroreflectors is fixed relative to said polarization beamsplitter and the other of said pair of retroreflectors is movable relative to said polarization beamsplitter in a direction parallel with said transmitted beam of said collinear orthogonally polarized pair of beams.

52. A heterodyne interferometer system in accordance with claim 51, wherein said electrical measurement signal has a frequency $f_c$ defined by the expression:

$$f_c = f_o + 2v/\lambda$$

where
$f_o$ is the frequency of said reference signal;
v is the velocity of said movable retroreflector, being positive when the movement is toward said beamsplitter and negative when the movement is away from said beamsplitter; and λ the wavelength of a measurement beam derived from the transmitting of one of said pair of collinear orthogonally polarized beams by said beamsplitter.

53. A heterodyne interferometer system in accordance with claim 52, wherein said phase meter/accumlator means comprises means for integrating the frequency difference between said measurement signal and said reference signal for providing said output signal which is proportional to the displacement of said movable retroreflector.

54. A heterodyne interferometer system in accordance with claim 53, wherein said integrating means comprises means for adding the phase differences between said measurement signal and said reference signal on a cycle-by-cycle basis.

55. A heterodyne interferometer system in accordance with claim 54, wherein said cycle-by-cycle phase difference adding means comprises analog-to-digital conversion means connected to said measurement signal providing means and said reference signal providing means for providing a digital output signal proportional to the phase of said reference signal at the sampling instant.

56. A heterodyne interferometer system in accordance with claim 55, wherein said phase difference adding means further comprises a memory register connected to said analog-to-digital conversion means output for storing the corresponding previous cycle output of said analog-to-digital conversion means.

57. A heterodyne interferometer system in accordance with claim 56, wherein said phase difference adding means further comprises a phase difference calculator means connected to said analog-to-digital conversion means output and said memory register for providing a phase difference output signal derived from said digital output signal and said corresponding previous cycle output stored in said memory register, said phase difference output signal being the measure of phase difference between said reference signal and said measurement signal a each sampling instant.

58. A heterodyne interferometer system in accordance with claim 57, wherein said phase difference adding means further comprises accumlator means connected to said phase difference calculator means for adding the phase differences calculated at each cycle of said measurement signal, said output signal from said accumulator means being the sum of said phase differences and being proportional to the displacement of said movable retroreflector, the measured displacement d of said movable retroreflector being defined by the expression:

$$d = \frac{N\lambda}{4(2^m - 1)}$$

where
N is the output of said accumulator means;
λ is the wavelength of said measurement beam;
m is the number of bits of said analog-to-digital conversion means; and $$\frac{\lambda}{4(2^m - 1)}$$

is the measurement resolution of said system.

* * * * *